US012384301B2

(12) United States Patent
Kim et al.

(10) Patent No.: US 12,384,301 B2
(45) Date of Patent: Aug. 12, 2025

(54) STORAGE APPARATUS FOR VEHICLE AND VEHICLE INCLUDING THE SAME

(71) Applicant: HYUNDAI MOBIS CO., LTD., Seoul (KR)

(72) Inventors: Seung Cheol Kim, Yongin-si (KR); Jae Whoan Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 399 days.

(21) Appl. No.: 18/088,878

(22) Filed: Dec. 27, 2022

(65) Prior Publication Data

US 2024/0174181 A1 May 30, 2024

(30) Foreign Application Priority Data

Nov. 25, 2022 (KR) .................. 10-2022-0160129

(51) Int. Cl.
*B60R 7/04* (2006.01)
*B60R 11/00* (2006.01)

(52) U.S. Cl.
CPC .......... *B60R 7/04* (2013.01); *B60R 2011/0036* (2013.01)

(58) Field of Classification Search
CPC ..... B60R 7/02; B60R 7/04; B60R 2011/0019; B60R 2011/003; B60R 2011/0036; B60R 2011/0029; B60R 2011/0082; B60R 2011/0084; B60R 2011/0085; B60R 2011/0043; B60R 5/047
USPC .............. 296/37.5, 37.8, 37.13, 37.14, 37.16
See application file for complete search history.

(56) References Cited

U.S. PATENT DOCUMENTS

| | | | | |
|---|---|---|---|---|
| 5,492,257 | A * | 2/1996 | Demick | B60R 7/02 296/37.16 |
| 5,931,527 | A | 8/1999 | D'Onofrio et al. | |
| 6,196,605 | B1 * | 3/2001 | Baldas | B60R 7/046 224/543 |
| 6,257,640 | B1 * | 7/2001 | Leitner | B60R 9/00 224/404 |
| 6,942,270 | B1 * | 9/2005 | Mulvihill | B60R 7/02 224/543 |
| 2002/0145022 | A1 * | 10/2002 | Nguyen | B60R 7/02 224/539 |
| 2006/0022479 | A1 * | 2/2006 | Mulvihill | B60R 7/02 296/37.16 |
| 2009/0295184 | A1 * | 12/2009 | Karaki | B60R 5/04 296/37.16 |

(Continued)

FOREIGN PATENT DOCUMENTS

| | | |
|---|---|---|
| JP | 61-229630 A | 10/1986 |
| KR | 20-0378562 Y1 | 3/2005 |
| KR | 10-2020-0120836 A | 10/2020 |

OTHER PUBLICATIONS

Extended European search report issued on Aug. 21, 2023, in counterpart European Patent Application No. 22216783.5 (8 pages).

(Continued)

*Primary Examiner* — Gregory A Blankenship
(74) *Attorney, Agent, or Firm* — NSIP Law

(57) ABSTRACT

Disclosed is a storage apparatus that includes a door, slidably coupled to a back panel of a vehicle. The storage apparatus includes a support structure, connected to the door, that can be unfolded or folded in conjunction with movement of the door and supports the door.

14 Claims, 16 Drawing Sheets

(56) References Cited

U.S. PATENT DOCUMENTS

| | | |
|---|---|---|
| 2010/0051616 A1 | 3/2010 | Shea et al. |
| 2010/0301626 A1* | 12/2010 | Reid .................. B60R 5/045 |
| | | 296/37.16 |
| 2012/0061985 A1* | 3/2012 | Parker .................. B60J 5/104 |
| | | 296/136.03 |
| 2017/0036609 A1* | 2/2017 | Huebner .................. B60R 7/02 |
| 2018/0118119 A1* | 5/2018 | Na .................. B60R 7/02 |
| 2019/0077320 A1* | 3/2019 | Tena Han .................. B60R 7/02 |
| 2020/0223370 A1* | 7/2020 | Jayakumar .................. B60R 9/065 |
| 2024/0174181 A1* | 5/2024 | Kim .................. B60R 7/04 |

OTHER PUBLICATIONS

Korean Office Action issued on Jun. 20, 2024, in counterpart Korean Patent Application No. 10-2022-0160129 (5 pages in English, 5 pages in Korean).

Extended European Search Report issued Oct. 10, 2024 in counterpart European Patent Application No. 22 216 783.5 (9 pages in English).

* cited by examiner

STORAGE APPARATUS FOR VEHICLE AND VEHICLE INCLUDING THE SAME

CROSS-REFERENCE TO RELATED APPLICATION

This application claims the benefit under 35 USC § 119(a) of Korean Patent Application No. 10-2022-0160129, filed on Nov. 25, 2022, in the Korean Intellectual Property Office, the entire disclosure of which is incorporated herein by reference for all purposes.

BACKGROUND

1. Field

The present invention relates to a storage apparatus for a vehicle and a vehicle including the same.

2. Description of Related Art

Last mile delivery refers to a final process of delivering goods to consumers from, for example, shipping companies. This process is emerging as area in which companies seek to gain important competitive advantage. Accordingly, light-weight vehicles or small-sized vehicles modified to load goods in a region of a passenger seat, which is a seat next to a driver's seat of the vehicle, have been recently increasingly used by shipping companies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a storage apparatus that includes a door, slidably coupled to a back panel of a vehicle. The storage apparatus includes a support structure, which is connected to the door, that can be unfolded or folded in conjunction with movement of the door and supports the door.

The support structure may include a first support panel and a second support panel. The first support panel and the second support panel may be configured to be unfolded to be disposed to intersect the door; and folded to be disposed parallel to the door, in conjunction with the movement of the door.

The door is configured to be disposed at a first position parallel to the first support panel or the second support panel or the second support panel or a second position intersecting the first support panel or the second support panel.

The first support panel may include a first sliding groove disposed in an outer surface of the first support panel, the second support panel may include a second sliding groove disposed in an outer surface of the second support panel and connected to the first sliding groove when the second support panel is disposed parallel to the first support panel, and the support structure includes a fixing block disposed in at least one of the first sliding groove or the second sliding groove.

The first support panel and the second support panel may be movable in conjunction with the movement of the door to dispose the door at the first position or the second position in a state in which the fixing block is disposed in the first sliding groove, and maintain a state of being disposed parallel to each other to maintain a state of the door being disposed at the second position in a state in which the fixing block is disposed across the first sliding groove and the second sliding groove.

The door may include an edge panel configured to rotatably support the first support panel of the support structure, a door panel rotatably coupled to the edge panel, and a guide block coupled to the edge panel and slidably disposed on the back panel of the vehicle.

The support structure may include a hinge block coupled to the first support panel and the second support panel to rotatably support the first support panel and the second support panel and a plurality of hinge pins including a first hinge pin connecting the edge panel of the door and the first support panel and second hinge pins connecting the first support panel and the hinge block and connecting the second support panel and the hinge block.

The storage apparatus may include a cover board disposed at one side of each of the door and the support structure and covering the one side of each of the door and the support structure when the door is disposed at the second position, and a knob connecting the cover board and the edge panel of the door and allowing the cover board to move with the edge panel.

The cover board may include a board body covering the one side of each of the door and the support structure, and a contact part, protruding from the board body, configured to come into contact with or be separated from the knob by a change in position of the edge panel of the door.

The edge panel may include a rotating support protruding from a surface of the edge panel intersecting the back panel of the vehicle, and the door may include a link rotatably supported by the rotating support and a hook connected to the link, disposed to protrude from a surface of the edge panel facing the back panel of the vehicle, and moved in a direction from the edge panel toward the back panel of the vehicle in conjunction with movement of the link.

In another general aspect, an here is provided a vehicle including a vehicle body including a back panel having a panel body and a protruding part protruding from the panel body toward a passenger room and a bottom panel connected to the back panel and a storage apparatus disposed in the passenger room and coupled to the back panel. The storage apparatus includes a door slidably coupled to the back panel and a support structure, connected to the door, configured to be unfolded or folded in conjunction with movement of the door and to support the door.

The support structure may include a first support panel and a second support panel. The first support panel and the second support panel may be configured to be unfolded to intersect the door and folded to be disposed parallel to the door in conjunction with the movement of the door.

The door may be configured to be disposed at a first a first position parallel to the first support panel or the second support panel, or a second position intersecting the first support panel or the second support panel.

The door may include an edge panel configured to rotatably support the first support panel of the support structure, a door panel rotatably coupled to the edge panel, and a guide block coupled to the edge panel and slidably disposed on the back panel of the vehicle.

The edge panel may include a rotating support protruding from a surface of the edge panel disposed to intersect the back panel, and the door may include a link rotatably supported by the rotating support and a hook connected to the link, disposed to protrude from a surface of the edge panel facing the back panel, and moved in a direction from the edge panel toward the back panel of the vehicle in conjunction with movement of the link.

Other features and aspects will be apparent from the following detailed description, the drawings, and the claims.

Figure 1:
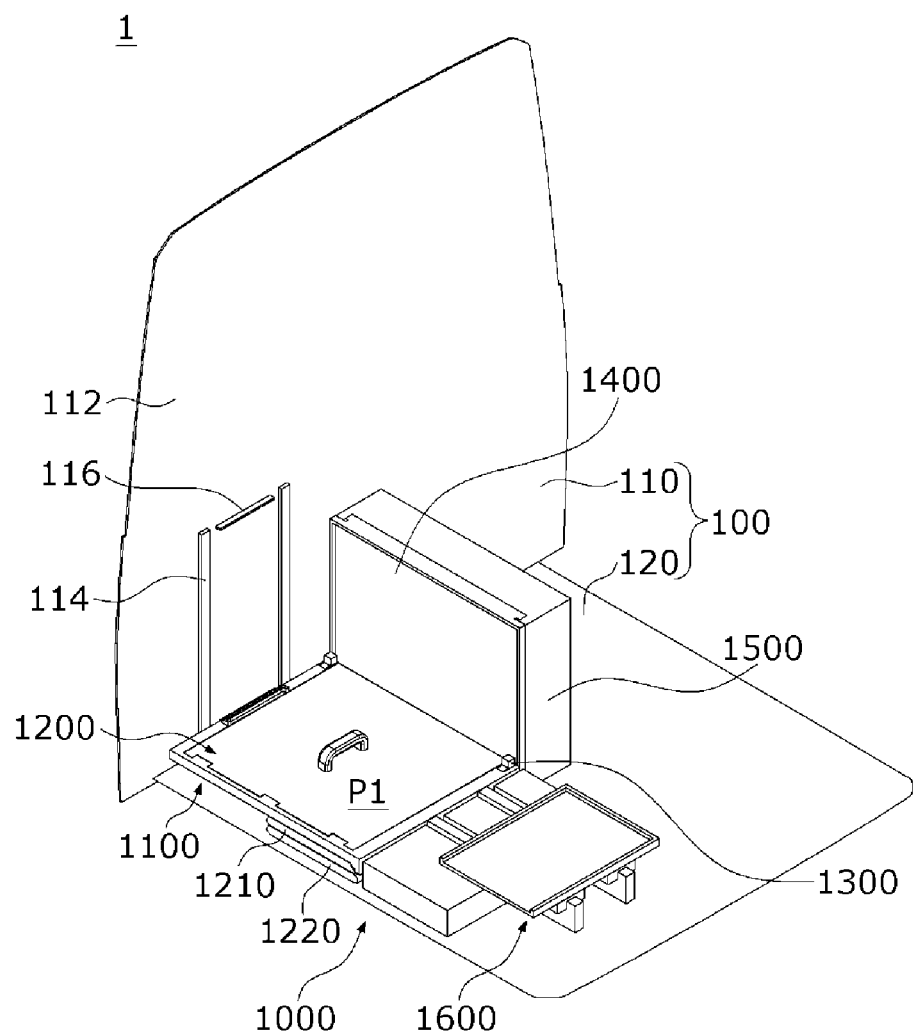
FIG. 1 is a view illustrating a state in which a storage apparatus for a vehicle is installed on a back panel and a bottom panel according to one embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is adequately disclosed, and a person with ordinary skill in the art can fully understand the scope of the present disclosure. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The use of the term "up" or "upward" herein is meant to refer to a direction wherein a corresponding vehicle includes wheels on a lower portion of the vehicle compared to a roof of the vehicle in an upper portion of the vehicle.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
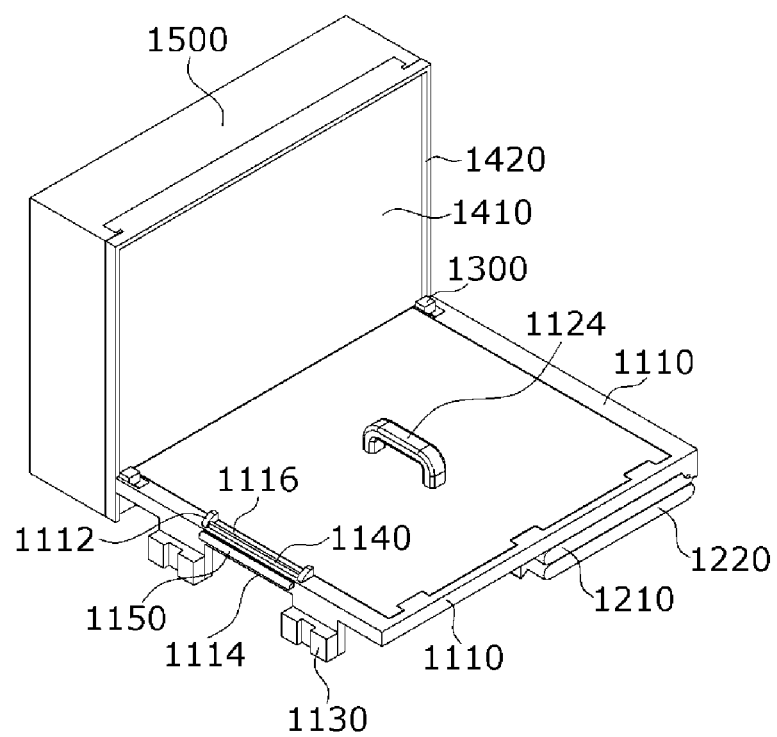
FIG. 2 is a rear perspective view illustrating the storage apparatus for a vehicle.
Figure 3:
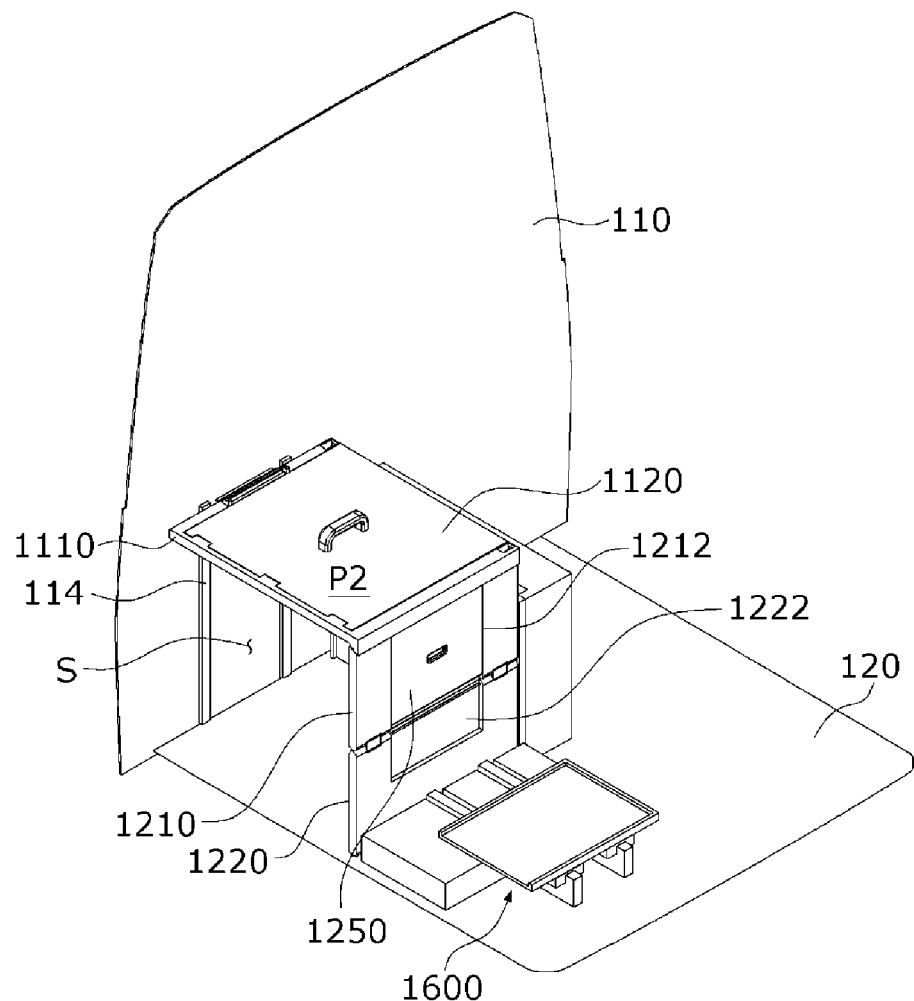
FIG. 3 is a view illustrating a state in which a door unit is disposed at a second position.
Figure 4:
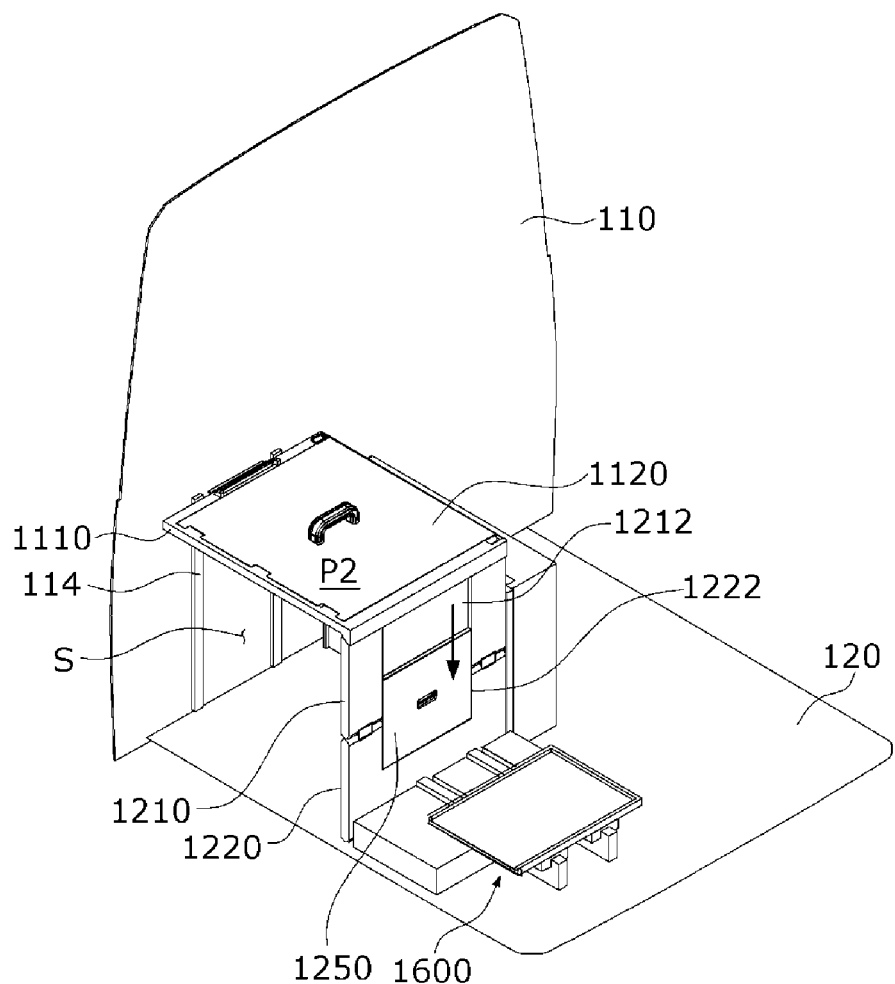
FIG. 4 is a view illustrating a state in which a fixing block is disposed across a first sliding groove and a second sliding groove in a state in which the door unit is disposed at the second position.
Figure 5:
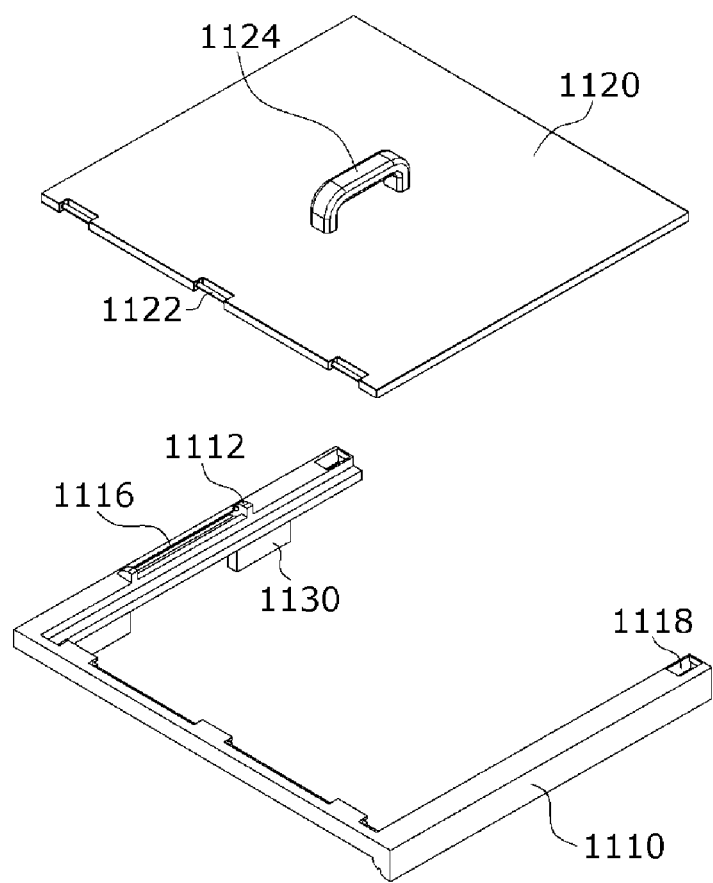
FIG. 5 is an exploded view illustrating an edge panel and a door panel of the door unit.
Figure 6:
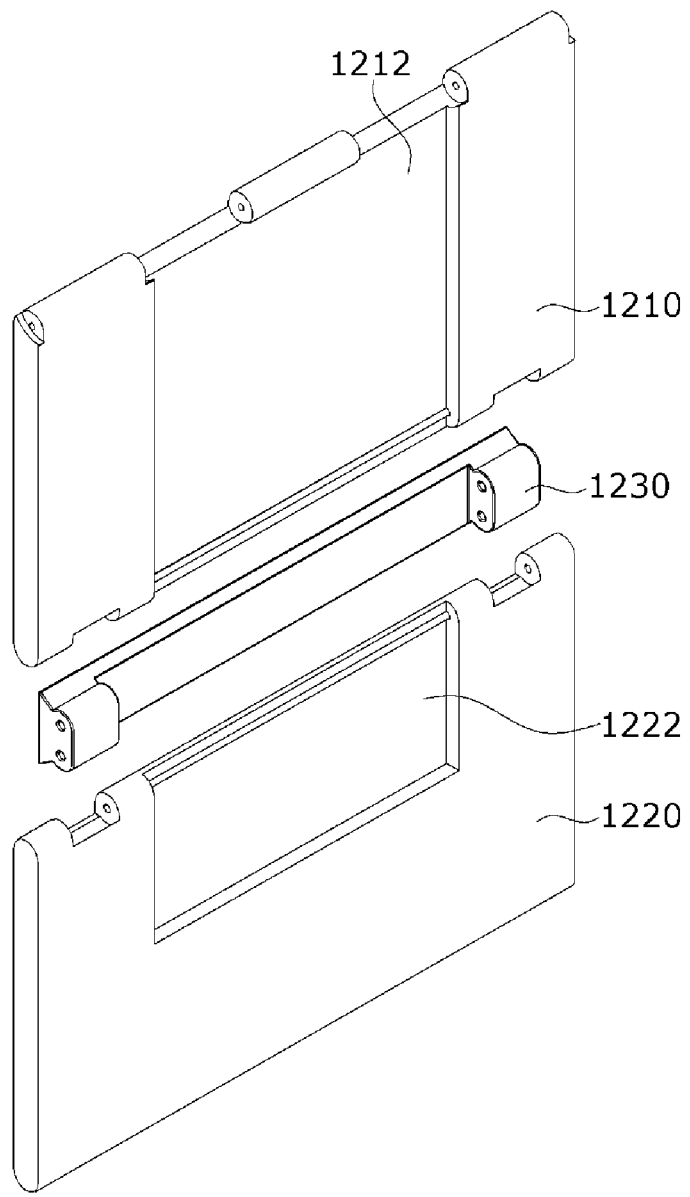
FIG. 6 is an exploded view illustrating a first support panel, a second support panel, and a hinge block of the support unit.
Figure 7:
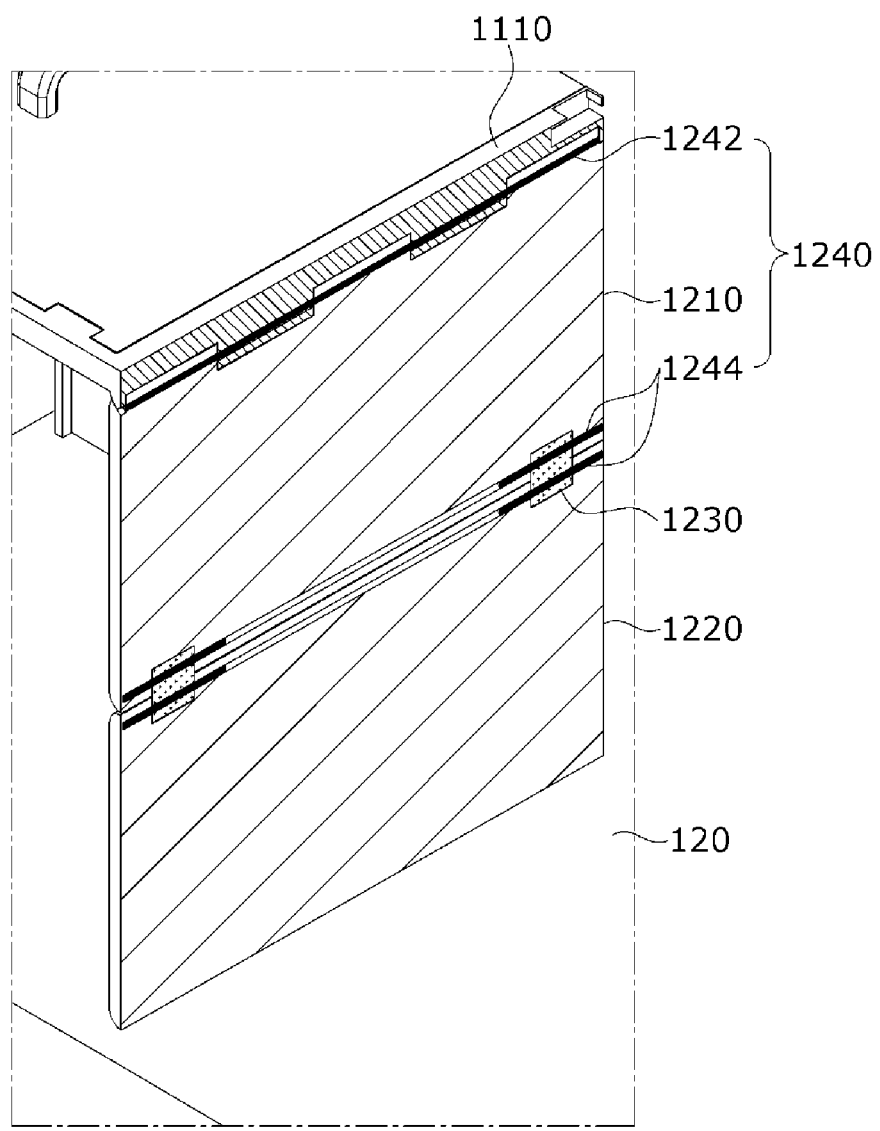
FIG. 7 is a cross-sectional view illustrating a state in which, by using a plurality of hinge pins, the edge panel and the first support panel are connected, and the edge panel and the first support panel, and the edge panel and the second support panel are connected.
Figure 8:
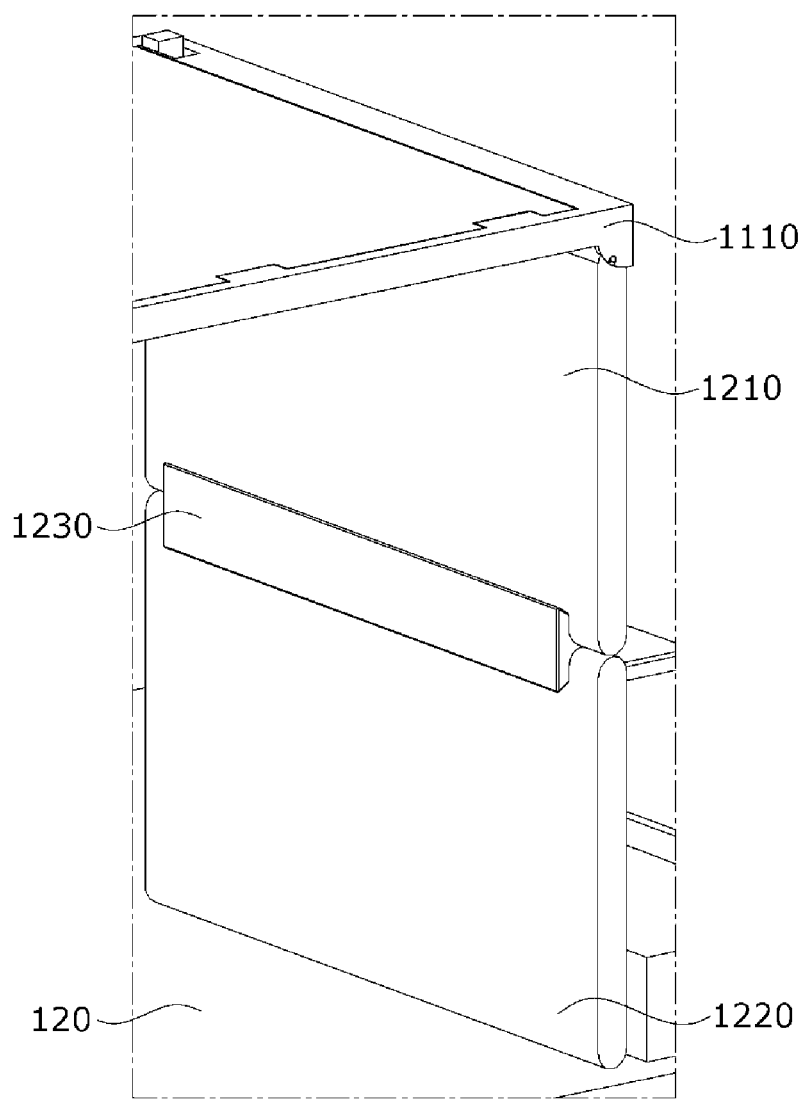
FIG. 8 is a view illustrating a state in which the hinge block is connected to each of the first support panel and the second support panel.

FIG. 1 is a view illustrating a state in which a storage apparatus for a vehicle is installed on a back panel and a bottom panel according to one embodiment, and FIG. 2 is a rear perspective view illustrating the storage apparatus for a vehicle. FIG. 3 is a view illustrating a state in which a door unit (for example, a door) is disposed at a second position, and FIG. 4 is a view illustrating a state in which a fixing block is disposed across a first sliding groove and a second sliding groove in a state in which the door unit is disposed at the second position. FIG. 5 is an exploded view illustrating an edge panel and a door panel of the door unit, and FIG. 6 is an exploded view illustrating a first support panel, a second support panel, and a hinge block of the support unit (for example, support structure). FIG. 7 is a cross-sectional view illustrating a state in which, by using a plurality of hinge pins, the edge panel and the first support panel are connected, and the edge panel and the first support panel, and the edge panel and the second support panel are connected, and FIG. 8 is a view illustrating a state in which the hinge block is connected to each of the first support panel and the second support panel.

Referring to FIG. 1, a vehicle 1 according to one embodiment includes a back panel 110 including a panel body 112, a guide rail 114 disposed in a longitudinal direction of the panel body 112, and a protruding part 116 protruding from the panel body 112 toward a passenger room, a bottom panel 120 disposed to perpendicularly intersect the back panel 110, and a storage apparatus 1000 for a vehicle disposed in a the passenger room and on the back panel 110 and the bottom panel 120.

The storage apparatus 1000 for a vehicle may include a door unit 1100 and a support unit 1200.

Referring to FIGS. 1 to 5, the door unit 1100 may be slidably coupled to the back panel 110 of the vehicle 1. The door unit 1100 may cover to open or close one side of a storage space S formed by the door unit 1100 and the support unit 1200.

The door unit 1100 may include an edge panel 1110, a door panel 1120, and a guide block 1130.

The edge panel 1110 may rotatably support a first support panel 1210, which will be described below, of the support unit 1200. The edge panel 1110 may be provided in a shape of which an inner portion is empty to accommodate the door panel 1120. The edge panel 1110 may be coupled to the guide block 1130 and moved in conjunction with movement of the guide block 1130. The edge panel 1110 may include a rotating support 1112. The rotating support 1112 may protrude from a surface of the edge panel 1110 disposed to intersect the back panel 110. The rotating support 1112 may support a link 1140 which will be described below.

The door panel 1120 may be rotatably coupled to the edge panel 1110. A hinge shaft 1122 having a cylindrical shape may be disposed in an end portion of the door panel 1120 to be rotatably supported by the edge panel 1110. In addition, a handle 1124 may be disposed on the door panel 1120 as illustrated in FIGS. 1 to 5. A user may move the door unit 1100 in a longitudinal direction of the guide rail 114 of the back panel 110 using the handle 1124, The guide block 1130 may be coupled to the edge panel 1110. More specifically, as illustrated in FIG. 2, the guide block 1130 may be disposed on a surface of the edge panel 1110 facing the back panel 110. The guide block 1130 may be slidably coupled to the guide rail 114 of the back panel 110. The guide block 1130 may be provided in a "c" shape to be coupled to the guide rail 114.

The guide block 1130 may move in the same direction as a direction in which the handle 1124 of the door panel 1120 moves. The edge panel 1110 and the first support panel 1210, which will be described below, of the support unit 1200 may be moved with the guide block 1130 by movement of the guide block 1130.

Referring to FIGS. 1 to 8, the support unit 1200 may be connected to the door unit 1100 to be unfolded or folded in conjunction with movement of the door unit 1100. The support unit 1200 may support the door unit 1100. The support unit 1200 may include the first support panel 1210, a second support panel 1220, a hinge block 1230, a plurality of hinge pins 1240, and a fixing block 1250.

The first support panel 1210 may be rotatably coupled to the edge panel 1110 of the door unit 1100. The first support panel 1210 may have a length corresponding to a width of the edge panel 1110. The first support panel 1210 may be disposed between the edge panel 1110 and the bottom panel 120. The first support panel 1210 may include a first sliding groove 1212. The first sliding groove 1212 may be disposed on an outer surface of the first support panel 1210. In this case, the outer surface may refer to a surface exposed to a passenger who rides in the vehicle 1.

The second support panel 1220 may be rotatably connected to the hinge block 1230. The second support panel 1220 may be disposed between the edge panel 1110 and the bottom panel 120. The second support panel 1220 may be disposed to be spaced apart from the first support panel 1210 with the hinge block 1230 interposed therebetween. The second support panel 1220 may have a length corresponding to the length of the first support panel 1210. The second support panel 1220 may move in conjunction with movement of the first support panel 1210.

The second support panel 1220 may include a second sliding groove 1222. The second sliding groove 1222 may be disposed in an outer surface of the second support panel 1220. The second sliding groove 1222 may be connected to the first sliding groove 1212 when the second support panel 1220 is disposed parallel to the first support panel 1210. Conversely, the second sliding groove 1222 may be disposed to face the first sliding groove 1212 when the second support panel 1220 is disposed to face the first support panel 1210.

The first support panel 1210 and the second support panel 1220 may be unfolded to be disposed to intersect the door unit 1100 or folded to be disposed parallel to the door unit 1100 in conjunction with movement of the door unit 1100.

More specifically, when the first support panel 1210 and the second support panel 1220 are unfolded to be disposed to intersect the door unit 1100, the second support panel 1220 may be supported by the bottom panel 120 and also disposed parallel to the first support panel 1210 in the longitudinal direction of the guide rail 114 of the back panel 110. Accordingly, the first support panel 1210 and the second support panel 1220 may form the storage space S with the door unit 1100.

Conversely, when the first support panel 1210 and the second support panel 1220 are folded to be disposed parallel to the door unit 1100, as illustrated in FIG. 1, the door unit 1100 may be disposed parallel to the bottom panel 120 and supported by the first support panel 1210. In addition, the door unit 1100 and the support unit 1200 may be disposed between the back panel 110 and a holding unit 1600 which will be described below. Accordingly, the door unit 1100 and the support unit 1200 disposed between the back panel 110 and the holding unit 1600, which will be described below, can be prevented from shaking in a longitudinal direction of the bottom panel 120.

In addition, the door unit 1100 may be disposed at a first position P1 at which the door unit 1100 is disposed parallel to the first support panel 1210 or the second support panel 1220 or at a second position P2 at which the door unit 1100 is disposed to intersect the first support panel 1210 or the second support panel 1220.

More specifically, the door unit 1100 may be disposed at the first position P1 as illustrated in FIG. 1, and the guide block 1130 of the door panel 1120 may be moved along the guide rail 114 of the back panel 110 so that the door unit 1100 may be disposed at the second position P2 as illustrated in FIG. 3. When the door unit 1100 is disposed at the second position P2, the door unit 1100 and the support unit 1200 may form the storage space S. When the door unit 1100 is disposed at the second position P2, and the storage space S is formed, the user may pull the handle 1124 of the door panel 1120 to open the storage space S. As described above, since the door unit 1100 of the vehicle 1 may be freely disposed to form or not to form the storage space S, spatial utilization inside the vehicle 1 can be improved.

As illustrated in FIGS. 6 to 8, the hinge block 1230 may be coupled to the first support panel 1210 and the second support panel 1220 to rotatably support the first support panel 1210 and the second support panel 1220.

In a state in which the hinge block 1230 is coupled to the first support panel 1210 and the second support panel 1220, the hinge block 1230 may be disposed to be colinear with the outer surface of the first support panel 1210 and the outer surface of the second support panel 1220 as illustrated in FIG. 3. In addition, as illustrated in FIG. 8, the hinge block 1230 may further protrude toward the storage space S formed by the door unit 1100 and the support unit 1200 from the storage apparatus 1000 for a vehicle in a direction toward the back panel 110 than an inner surface of the first support panel 1210 and an inner surface of the second support panel 1220. Accordingly, a part of the hinge block 1230 may be disposed to overlap a part of the inner surface of the first support panel 1210 and a part of the inner surface of the second support panel 1220.

Accordingly, when the first support panel 1210 and the second support panel 1220 are rotated about the hinge block 1230, the hinge block 1230 may prevent the first support panel 1210 and the second support panel 1220 from being bent and folded outward from the edge panel 1110 on the contrary that the first support panel 1210 and the second support panel 1220 are bent and folded toward the storage space S. Accordingly, a phenomenon in which the first support panel 1210 and the second support panel 1220 collide with the holding unit 1600, which will be described below, can be prevented.

The plurality of hinge pins 1240 may allow smooth rotation of the support unit 1200. The plurality of hinge pins 1240 may include a first hinge pin 1242 and second hinge pins 1244.

As illustrated in FIG. 7, the first hinge pin 1242 may connect the edge panel 1110 of the door unit 1100 and the first support panel 1210. The first hinge pin 1242 may pass through the edge panel 1110 and the first support panel 1210 to connect the edge panel 1110 and the first support panel 1210. The first hinge pin 1242 may be rotated with the first support panel 1210 while connected to the edge panel 1110. The first hinge pin 1242 may be provided in a cylindrical shape but is not limited thereto.

The second hinge pins 1244 may connect the first support panel 1210 and the hinge block 1230 and connect the second support panel 1220 and the hinge block 1230. Each of the second hinge pins 1244 may have a length corresponding to the length of the first support panel 1210 or the second support panel 1220. The second hinge pin 1244 may be provided in a cylindrical shape but is not limited thereto. The second hinge pin 1244 may be provided as a plurality of second hinge pins 1244. The plurality of second hinge pins 1244 may be disposed to be spaced apart from each other in a direction from the first support panel 1210 toward the second support panel 1220. The second hinge pin 1244 may be rotated with the first support panel 1210 or the second support panel 1220 while connected to the hinge block 1230.

The fixing block 1250 may be disposed in at least one of the first sliding groove 1212 of the first support panel 1210 or the second sliding groove 1222 of the second support panel 1220. The fixing block 1250 may have a length corresponding to a length of the first sliding groove 1212 or the second sliding groove 1222 as illustrated in FIGS. 3 and 4.

The first support panel 1210 and the second support panel 1220 may move in conjunction with movement of the door unit 1100 so that the door unit 1100 is disposed at the first position P1 or the second position P2 in a state in which the fixing block 1250 is disposed in the first sliding groove 1212. As illustrated in FIG. 3, when the fixing block 1250 is disposed only in the first sliding groove 1212, the first support panel 1210 and the second support panel 1220 may be folded to face each other with respect to the hinge block 1230.

Conversely, in a state in which the fixing block 1250 is disposed across the first sliding groove 1212 and the second sliding groove 1222, the first support panel 1210 and the second support panel 1220 may maintain a state of being disposed parallel to each other to maintain a state in which the door unit 1100 is disposed at the second position P2. As illustrated in FIG. 4, when the fixing block 1250 is disposed across the first sliding groove 1212 and the second sliding groove 1222, the first support panel 1210 and the second support panel 1220 may be prevented from being folded toward the storage space S by the fixing block 1250. Accordingly, since the fixing block 1250 maintains an unfolded state of the first support panel 1210 and the second support panel 1220, the storage space S can be stably maintained.

Although not illustrated in the drawings, magnets having S poles and N poles may be installed in the fixing block 1250. The magnets may be disposed on one end portion and the other end portion of the fixing block 1250 in a longitudinal direction thereof. Magnets which have poles disposed opposite to the poles of the magnets embedded in the fixing block 1250 when the fixing block 1250 is in contact with each of the edge panel 1110 and the second support panel 1220, may be embedded in the edge panel 1110 and the second support panel 1220.

Accordingly, when the fixing block 1250 is disposed in the first sliding groove 1212, a state in which the fixing block 1250 is disposed in the first sliding groove 1212 can be stably maintained due to a property that the poles of the magnets embedded in the fixing block 1250 and the edge panel 1110 are to be in contact with each other. Conversely, when the fixing block 1250 is disposed across the first sliding groove 1212 and the second sliding groove 1222, due to a property that the poles of the magnets embedded in the fixing block 1250 and the second sliding groove 1222 are to be in contact with each other, the fixing block 1250 may be disposed across the first sliding groove 1212 and the second sliding groove 1222, and a state in which the fixing block 1250 is in contact with the second support panel 1220 can be stably maintained.

In addition, although not illustrated in the drawings, the edge panel 1110 or the second support panel 1220 may be formed of an iron material to which the magnets embedded in the fixing block 1250 may stick.

Hereinafter, a structure for maintaining the state in which the door unit 1100 is disposed at the second position P2 using the link 1140 and a hook 1150 will be described.

Figure 9A:
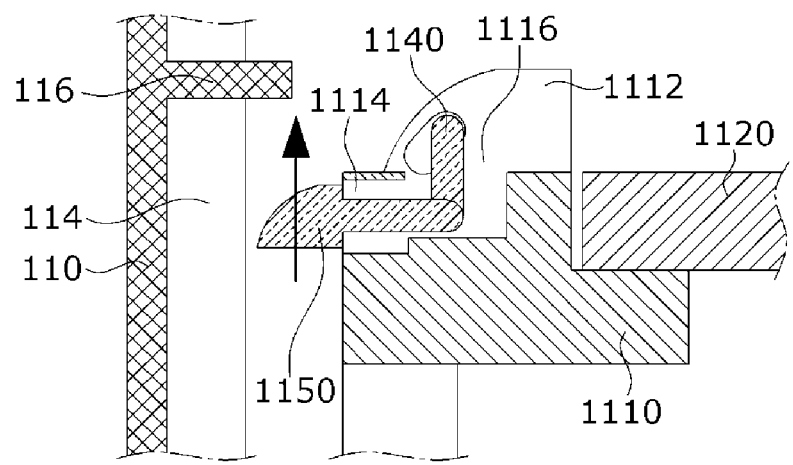
FIGS. 9A to 9C are views illustrating states in which a link and a hook move while the door unit is disposed at the second position from a first position.
Figure 9B:
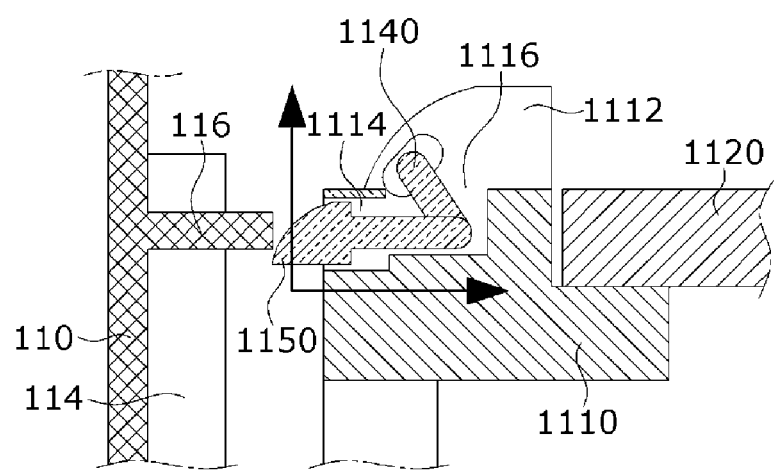
Figure 9C:
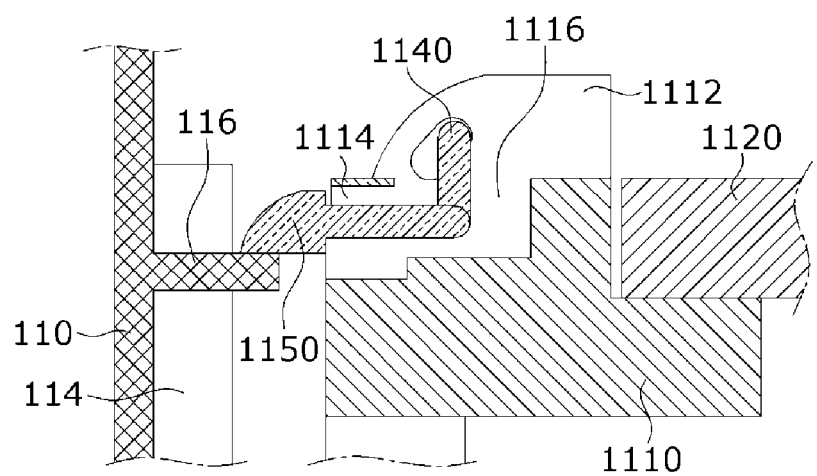

FIGS. 9A to 9C are views illustrating states in which the link and the hook move while the door unit is disposed at the second position from the first position.

Referring to FIGS. 1 to 9B, the door unit 1100 of the storage apparatus 1000 for a vehicle may include the link 1140 and the hook 1150.

The link 1140 may be rotatably supported by the rotating support 1112 of the edge panel 1110. The link 1140 may protrude outward from an inner side of the edge panel 1110.

The hook 1150 may be rotatably connected to the link 1140 and disposed to protrude from a surface of the edge panel 1110 facing the back panel 110 of the vehicle body 100. The hook 1150 may move in a direction from the edge panel 1110 toward the back panel 110 of the vehicle 1 in conjunction with movement of the link 1140.

A first slit groove 1114 and a second slit groove 1116 may be formed in the edge panel 1110. The first slit groove 1114 may be formed in the surface of the edge panel facing the back panel 110 of the vehicle body 100, and the second slit groove 1116 may be formed in a surface of the edge panel 1110 facing a ceiling panel (not shown) of the vehicle body 100. The first slit groove 1114 and the second slit groove 1116 may be connected to each other as illustrated in FIGS. 9A to 9C. The hook 1150 may be movably disposed in the first slit groove 1114, and the link 1140 may be movably disposed in the second slit groove 1116.

As illustrated in FIGS. 1 and 9A, in the state in which the door unit 1100 is disposed at the first position P1, the hook 1150 is disposed under the protruding part 116 of the back panel 110 in FIG. 9A. In this case, a part of the protruding part 116 and a part of the hook 1150 may be disposed to overlap in FIG. 9A.

When the door unit 1100 moves upward in this state, as illustrated in FIG. 9B, the hook 1150 is pressed by the protruding part 116 and is moved in a direction (for example, an intersecting direction) different from a direction in which the door unit 1100 moves. More specifically, the hook 1150 moves toward an inner portion of the first slit groove 1114. When the hook 1150 moves toward the inner portion of the first slit groove 1114, the link 1140 connected to the hook 1150 rotates in conjunction with movement of the hook 1150. Since the hook 1150 is connected to the link 1140, when the hook 1150 is pressed by the protruding part 116, the link 1140 may suppress movement of the hook 1150 in reverse to not allow the hook 1150 to move further outward from the inner portion the first slit groove 1114.

When the hook 1150 moves to the inner portion of the first slit groove 1114 so that the protruding part 116 of the back panel 110 and the hook 1150 are disposed to be misaligned with each other without overlapping each other, the door unit 1100 may move upward further in the same direction as a direction in which the door unit 1100 has moved upward. When the door unit 1100 continuously moves upward so that the hook 1150 is disposed above the protruding part 116 as illustrated in FIG. 9C, the hook 1150 may move toward the back panel 110 outward from the inner portion of the first slit groove 1114. In this case, the link 1140 may rotate in conjunction with movement of the hook 1150.

When the hook 1150 moves further toward the back panel 110 outward from the inner portion of the first slit groove 1114 so that the part of the protruding part 116 of the back panel 110 and the part of the hook 1150 are disposed to overlap as illustrated in FIG. 9C, the door unit 1100 may be disposed at the second position P2. When the door unit 1100 is disposed at the second position P2, the hook 1150 may be supported by the protruding part 116. When the hook 1150 is supported by the protruding part 116, the state in which the door unit 1100 is disposed at the second position P2 can be stably maintained.

In addition, when the hook 1150 is supported by the protruding part 116 of the back panel 110 so that the door unit 1100 is disposed at the second position P2, the first support panel 1210 and the second support panel 1220 may be unfolded to be disposed parallel to each other, and thus the door unit 1100 and the support unit 1200 may form the storage space S. In addition, when the hook 1150 is supported by the protruding part 116 of the back panel 110, movement of the door unit 1100 is suppressed, and thus a state in which the storage space S is formed can be stably maintained.

Hereinafter, a structure covering one side of each of the door unit 1100 and the support unit 1200 will be described.

Figure 10:
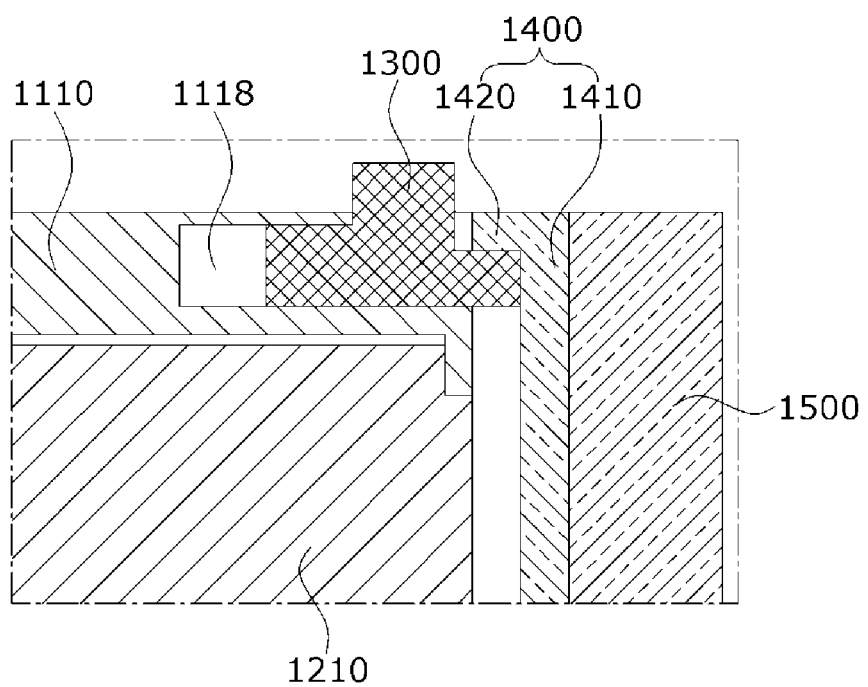
FIG. 10 is a cross-sectional view illustrating a state in which a knob is in contact with a cover board.
Figure 11:
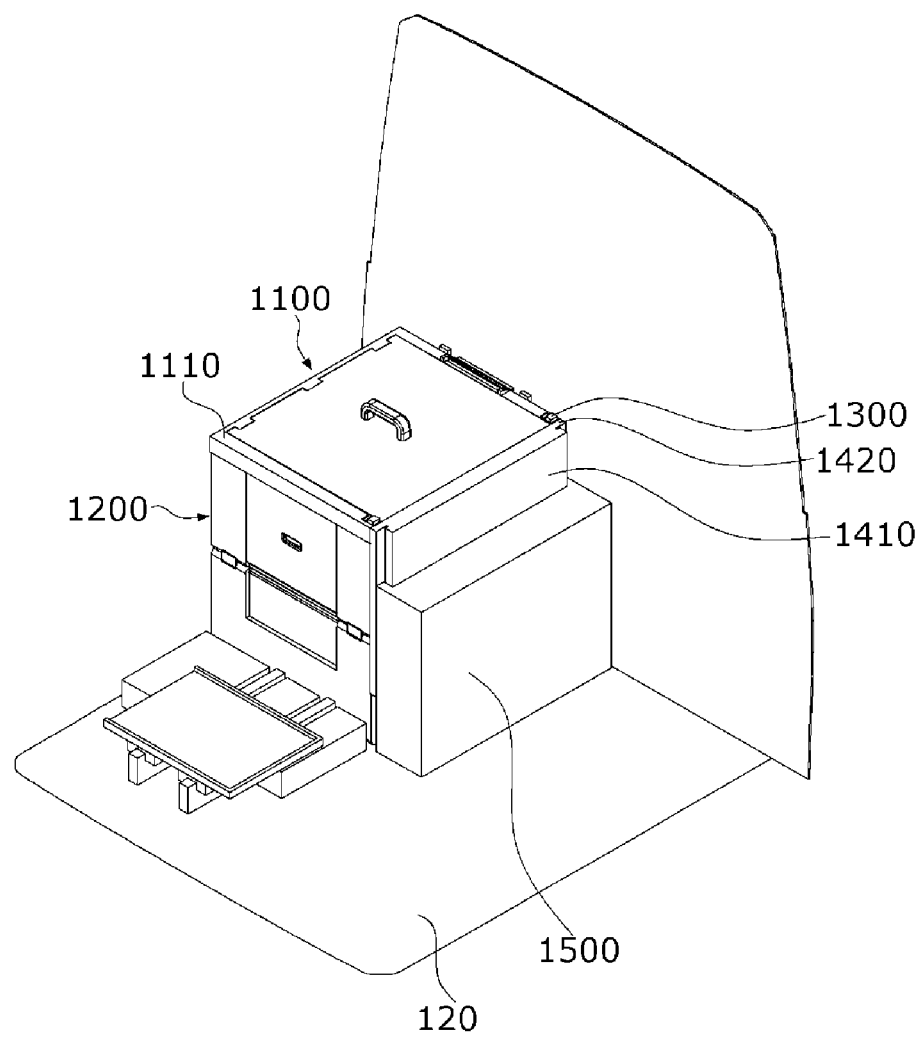
FIG. 11 is a view illustrating a state in which the cover board is moved by being pulled by the knob.
Figure 12:
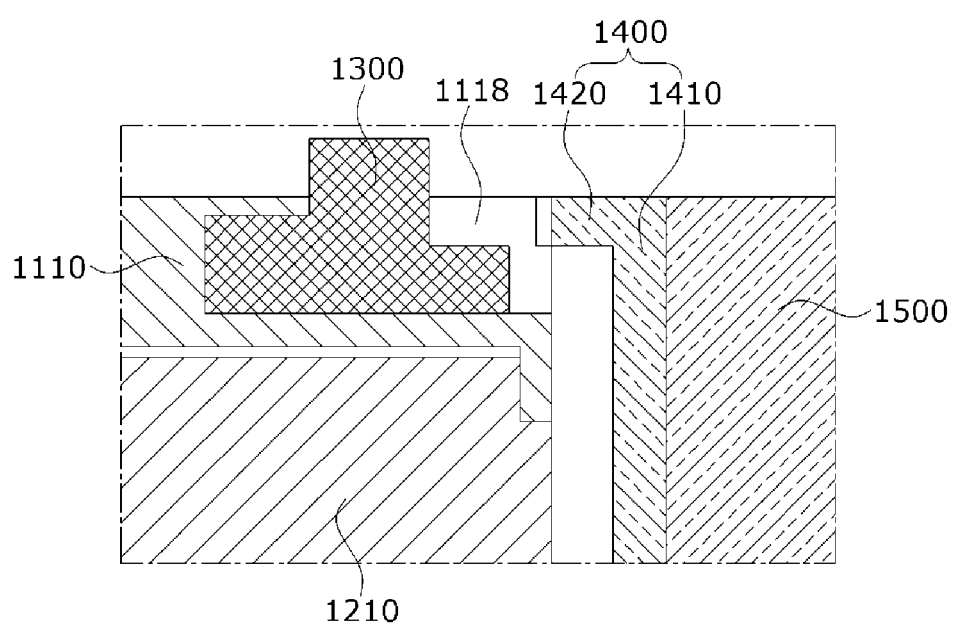
FIG. 12 is a cross-sectional view illustrating a state in which the state in which the knob is in contact with the cover board is released.

FIG. 10 is a cross-sectional view illustrating a state in which a knob is in contact with a cover board, FIG. 11 is a view illustrating a state in which the cover board is moved by being pulled by the knob, and FIG. 12 is a cross-sectional view illustrating a state in which the state in which the knob is in contact with the cover board is released.

Referring to FIGS. 1 to 12, the storage apparatus 1000 for a vehicle may include a knob 1300, a cover board 1400, and a console 1500.

The knob 1300 may be movably coupled to the edge panel 1110 of the door unit 1100. The knob 1300 may connect the edge panel 1110 and the cover board 1400 so that the cover board 1400 is moved with the edge panel 1110. A third slit groove 1118, in which the knob is movably accommodated, may be disposed in the edge panel 1110. The third slit groove 1118 may be disposed as a plurality of third slit grooves 1118 which are spaced apart from each other in the edge panel 1110. The knob 1300 may be provided as a plurality of knobs 1300 which are disposed so that each of the plurality of knobs 1300 is disposed in one of the plurality of third slit grooves 1118.

The cover board 1400 may be disposed at one side of each of the door unit 1100 and the support unit 1200. The cover board 1400 may cover one side of each of the door unit 1100 and the support unit 1200 when the door unit 1100 is disposed at the second position P2.

The cover board 1400 may include a board body 1410 and a contact part 1420. More specifically, the board body 1410 may cover a portion of the storage space S formed by the door unit 1100 disposed at the second position P2 and the support unit 1200.

The board body 1410 may be slidably coupled to the console 1500. The board body 1410 may cover one side of each of the door unit 1100 and the support unit 1200. The contact part 1420 may protrude from the board body 1410. The contact part 1420 may come into contact with or be separated from the knob 1300 by a change in position of the edge panel 1110.

The console 1500 may slidably support the cover board 1400. A groove for slidably accommodating the cover board 1400 may be formed in the console 1500. The console 1500 may cover a portion of the storage space S formed by the door unit 1100 and the support unit 1200.

As illustrated in FIG. 1, in the state in which the door unit 1100 is disposed at the first position P1, the knob 1300 is disposed under the cover board 1400 while coupled to the edge panel 1110. In this state, the knob 1300 is not in contact with the contact part 1420 of the cover board 1400.

When the door unit 1100 begins to move upward in this state, the knob 1300 may move upward from a lower side of the cover board 1400 with the edge panel 1110. As illustrated in FIG. 10, the door unit 1100 may move upward so that the knob 1300 comes into contact with the contact part 1420 of the cover board 1400. When the door unit 1100 continues to move upward in this state, the cover board 1400 may be moved by the knob 1300 in the same direction as a direction in which the door unit 1100 moves.

When the door unit 1100 is moved upward and disposed at the second position P2, a portion of the storage space S which is not covered by the console 1500 may be covered by the cover board 1400 as illustrated in FIG. 11. Accordingly, a phenomenon, in which goods stored in the storage space S escape through the portion of the storage space S which is not covered by the console 1500, can be prevented.

As illustrated in FIG. 12, when the knob 1300 slidably moves inward from the outside of the third slit groove 1118, a state in which the knob 1300 is in contact with the contact part 1420 of the cover board 1400 may be released. When the contact state between the knob 1300 and the cover board 1400 is released, the cover board 1400 may enter a state of being slidable on the console 1500. In the state in which the cover board 1400 is slidable on the console 1500, when the cover board 1400 is moved so that a space between the door unit 1100 and the console 1500 is exposed, the user may pull goods stored in the storage space S out through the exposed space.

Since the knob 1300 of the storage apparatus 1000 for a vehicle may be moved to open or close one side of the storage space S by manipulation of the user, user's storage utilization can be improved due to the knob 1300.

Hereinafter, the holding unit 1600 will be described.

Referring to FIGS. 1, 3, and 4, the storage apparatus 1000 for a vehicle may include the holding unit 1600. The holding unit 1600 may be disposed at one side of each of the door unit 1100 and the support unit 1200. The holding unit 1600 may include a rail, a rail block, and a holder which is coupled to the rail block and on which goods may be disposed. Goods which are not stored in the storage space S, a convenience apparatus such as a humidifier, a dehumidifier, or a refrigerator, or the like, may be disposed on the holding unit 1600. Although not illustrated in the drawings, a connector through which power is supplied to the convenience apparatus or the convenience apparatus is charged may be installed on the holding unit 1600.

Hereinafter, a door unit 1100 according to another embodiment and a screen 1700 will be described.

Figure 13:
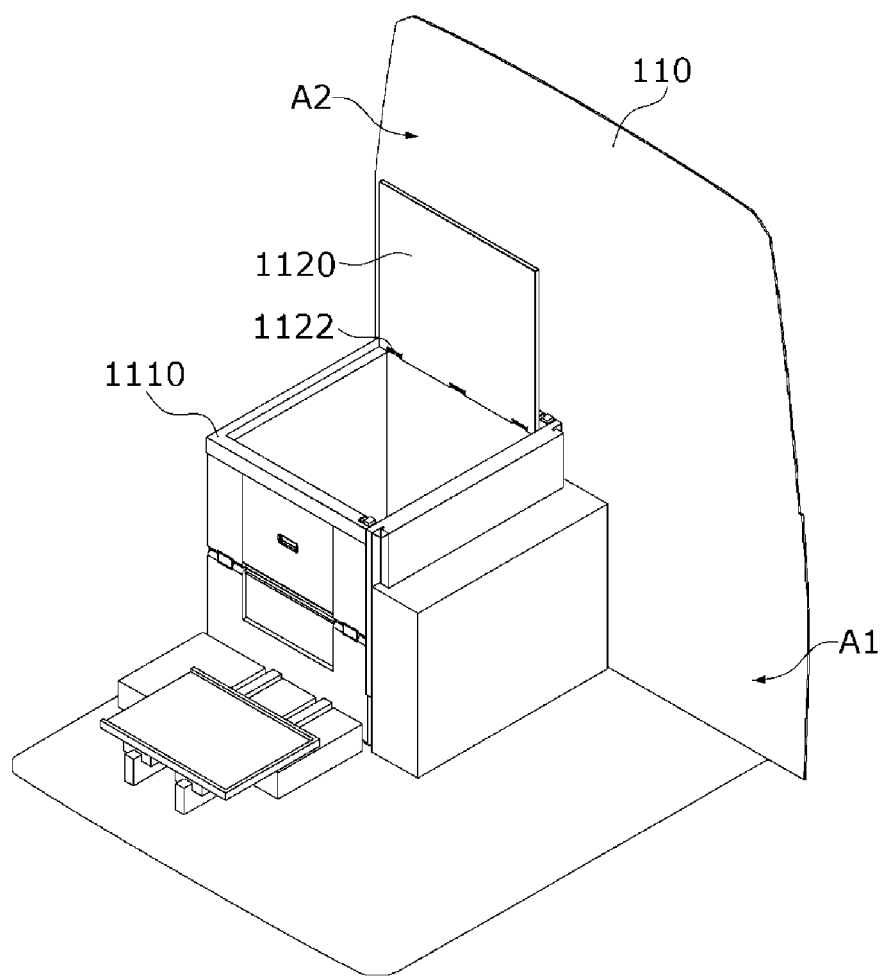
FIG. 13 is a view illustrating a door unit according to another embodiment.
Figure 14:
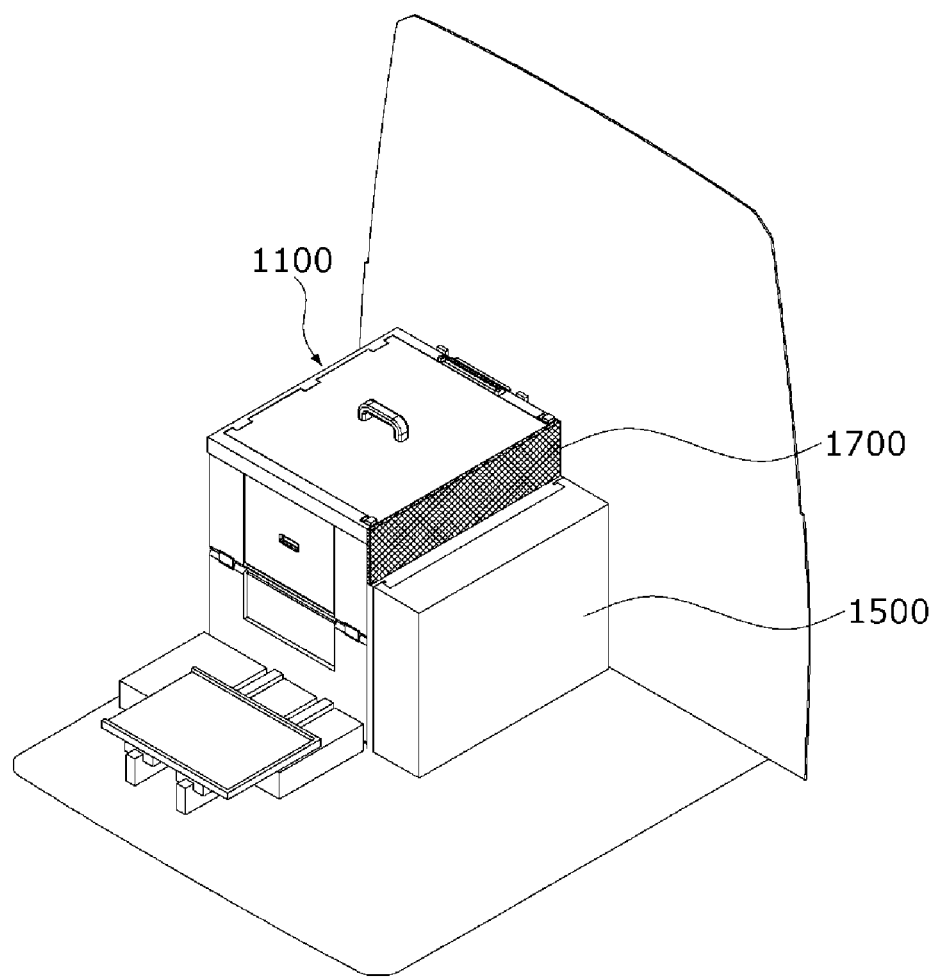
FIG. 14 is a view illustrating a state in which a screen covers one side of each of a door unit and a support unit.

FIG. 13 is a view illustrating a door unit according to another embodiment, and FIG. 14 is a view illustrating a state in which a screen covers one side of each of the door unit and a support unit.

Referring to FIG. 13, a hinge shaft 1122 of a door panel 1120 of a door unit 1100 may also be formed on a surface of the door panel 1120 disposed parallel to a back panel 110 of a vehicle body 100. Accordingly, the door panel 1120 may rotate in a direction toward the back panel 110 of the vehicle body 100 while coupled to an edge panel 1110. Accordingly, a phenomenon in which a body of a user sitting on a driver's seat moves from a driver's seat region A1 toward a storage region A2 can be prevented. Accordingly, ease of opening and closing the door panel 1120 of the user can be improved.

Referring to FIG. 14, a storage apparatus 1000 for a vehicle may further include the screen 1700. The screen 1700 may cover an open space between a console 1500 and the door unit 1100. The screen 1700 may include a mesh having a grid shape. The screen 1700 may be attached to the edge panel 1110 using a magnet. A phenomenon in which goods escape through the open space between the console 1500 and the door unit 1100 can be prevented by the screen 1700.

According to one embodiment, in a storage apparatus for a vehicle, since damage to goods loaded in a region of a passenger seat is prevented, delivery reliability can be improved.

Examples of the present disclosure are directed to providing a storage apparatus for a vehicle and reducing a risk of a driver's accident by eliminating interference of a driver's sight toward a passenger seat (for example, associated with the storage apparatus).

Examples of the present disclosure are directed to improving user convenience by providing a storage apparatus for a vehicle installed in a region of a passenger seat in which goods can be easily stored.

Last mile delivery vehicle includes the removal of a seat disposed in the region of a passenger seat to maximize the loading space. Aspects of the present disclosure provide an apparatus which prevents damage to goods loaded in the region of the passenger seat and also does not interfere with a driver's sight.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A storage apparatus, comprising:
 a door, slidably coupled to a back panel of a vehicle; and
 a support structure, connected to the door, the support structure being configured to be unfolded or folded in conjunction with movement of the door, and to support the door,
 wherein the support structure comprises:
  a first support panel; and
  a second support panel, and
 wherein the first support panel and the second support panel are configured to be:
  unfolded to intersect the door; and
  folded to be disposed parallel to the door in conjunction with the movement of the door.

2. The storage apparatus of claim 1, wherein the door is configured to be disposed at:
 a first position parallel to at least one of the first support panel or the second support panel; or
 a second position intersecting at least one of the first support panel or the second support panel.

3. The storage apparatus of claim 2,
 wherein the first support panel includes a first sliding groove disposed in an outer surface of the first support panel;
 wherein the second support panel includes a second sliding groove disposed in an outer surface of the second support panel and connected to the first sliding groove when the second support panel is disposed parallel to the first support panel; and wherein the support structure includes a fixing block disposed in at least one of the first sliding groove or the second sliding groove.

4. The storage apparatus of claim 3, wherein the first support panel and the second support panel are configured to move in conjunction with the movement of the door to position the door at the first position or the second position when the fixing block is disposed in the first sliding groove, and wherein the first support panel and the second support panel are maintained in a parallel configuration to retain the door at the second position when the fixing block is disposed across both the first sliding groove and the second sliding groove.

5. The storage apparatus of claim 3, wherein the door comprises:

an edge panel configured to rotatably support the first support panel of the support structure;

a door panel rotatably coupled to the edge panel; and a guide block coupled to the edge panel and slidably disposed on the back panel of the vehicle.

6. The storage apparatus of claim 5, wherein the support structure comprises:

a hinge block coupled to the first support panel and the second support panel, the hinge block configured to rotatably support the first support panel and the second support panel; and a plurality of hinge pins, including:

a first hinge pin coupling the edge panel of the door to the first support panel; and second hinge pins coupling the first support panel to the hinge block and coupling the second support panel to the hinge block.

7. The storage apparatus of claim 6, comprising:

a cover board disposed on one side of each of the door and the support structure, the cover board configured to cover the one side of each of the door and the support structure when the door is in the second position; and a knob coupling the cover board to the edge panel of the door, the knob configured to allow the cover board to move with the edge panel.

8. The storage apparatus of claim 7, wherein the cover board comprises:

a board body configured to cover the one side of each of the door and the support structure; and a contact part protruding from the board body, the contact part configured to come into contact with, or be separated from, the knob based on a change in position of the edge panel of the door.

9. The storage apparatus of claim 7, wherein the edge panel comprises a rotating support protruding from a surface of the edge panel that intersects the back panel of the vehicle; and wherein the door comprises:

a link rotatably supported by the rotating support; and a hook connected to the link, the hook protruding from a surface of the edge panel facing the back panel of the vehicle and configured to move from the edge panel toward the back panel of the vehicle in conjunction with movement of the link.

10. A vehicle comprising:

a vehicle body including:

a back panel having a panel body and a protruding part extending from the panel body toward a passenger room; and a bottom panel connected to the back panel; and a storage apparatus disposed in the passenger room and coupled to the back panel, wherein the storage apparatus comprises:

a door slidably coupled to the back panel; and a support structure, connected to the door and configured to be unfolded or folded in conjunction with movement of the door and to support the door.

11. The vehicle of claim 10, wherein the support structure comprises a first support panel and a second support panel, the first and second support panels being configured to:

be unfolded to intersect the door; and be folded to be disposed parallel to the door, in conjunction with the movement of the door.

12. The vehicle of claim 11, wherein the door is configured to be disposed in:

a first position in which the door is parallel to the first support panel or the second support panel; or a second position in which the door intersects the first support panel or the second support panel.

13. The vehicle of claim 12, wherein the door comprises:

an edge panel configured to rotatably support the first support panel of the support structure;

a door panel rotatably coupled to the edge panel; and a guide block coupled to the edge panel and slidably disposed on the back panel of the vehicle.

14. The vehicle of claim 13, wherein the edge panel comprises a rotating support protruding from a surface of the edge panel that intersects the back panel; and wherein the door comprises:

a link rotatably supported by the rotating support; and a hook connected to the link, the hook protruding from a surface of the edge panel facing the back panel and configured to move from the edge panel toward the back panel of the vehicle in conjunction with movement of the link.

* * * * *